J. A. WIEDERSHEIM.
CHRISTMAS TREE GARDEN.
APPLICATION FILED APR. 17, 1914.
1,135,642.
Patented Apr. 13, 1915.
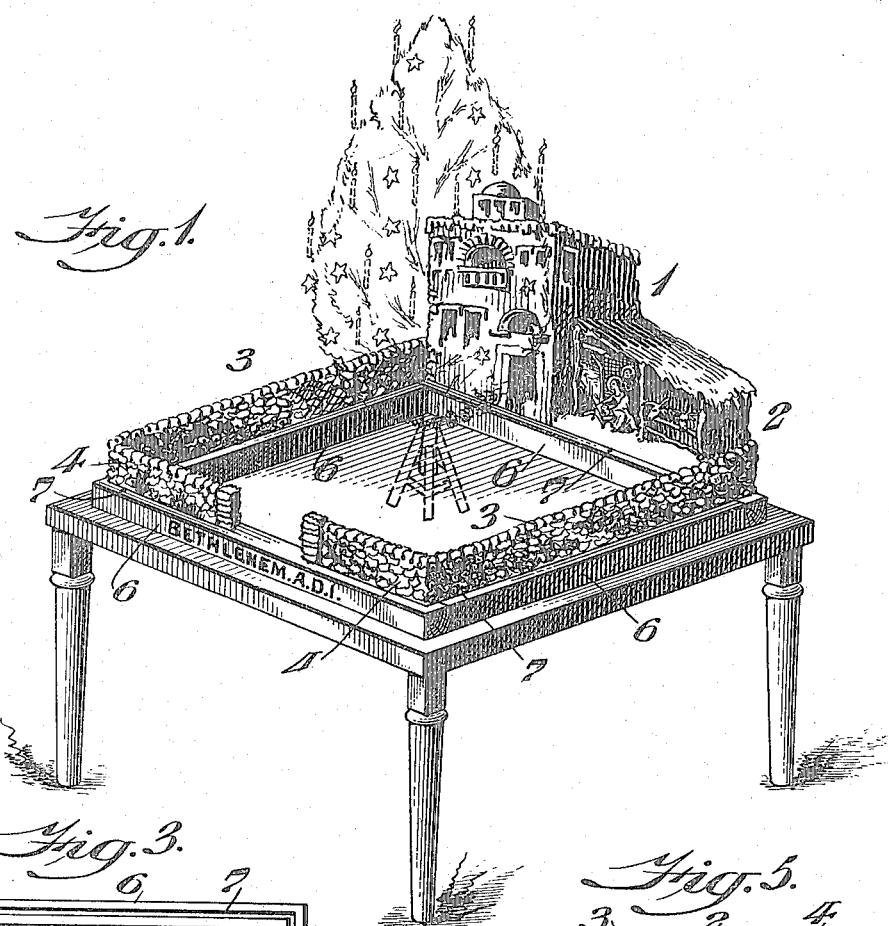
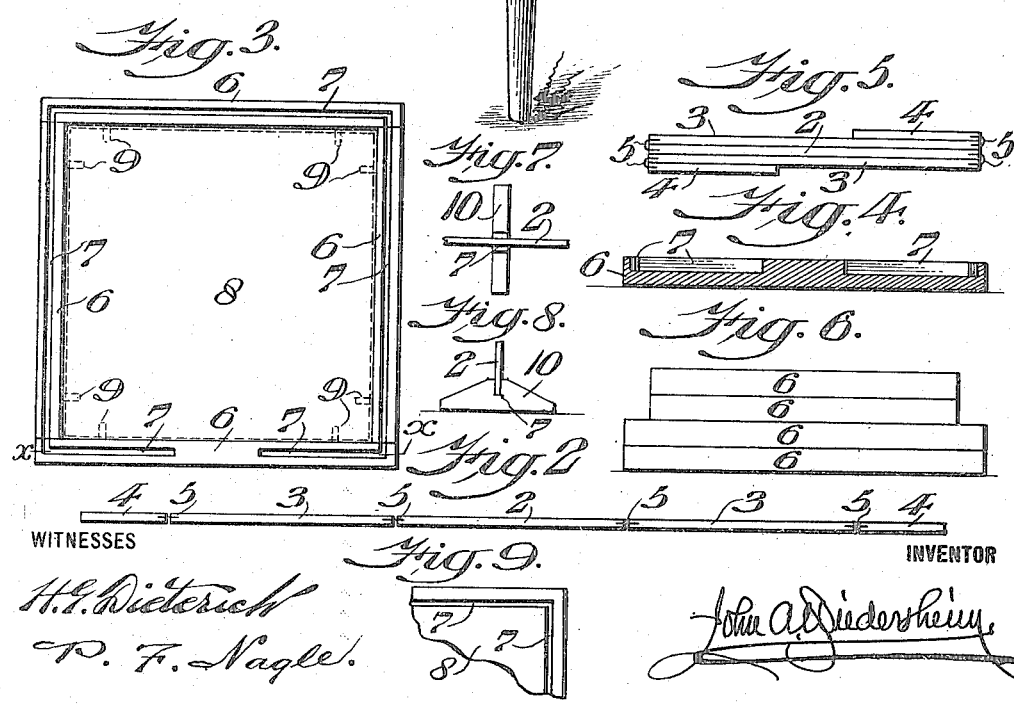

UNITED STATES PATENT OFFICE.

JOHN A. WIEDERSHEIM, OF PHILADELPHIA, PENNSYLVANIA.

CHRISTMAS-TREE GARDEN.

1,135,642. Specification of Letters Patent. Patented Apr. 13, 1915.

Application filed April 17, 1914. Serial No. 832,424.

*To all whom it may concern:*

Be it known that I, JOHN A. WIEDERSHEIM, a citizen of the United States, residing in the city and county of Philadelphia, State of Pennsylvania, have invented a new and useful Christmas-Tree Garden, of which the following is a specification:

My invention relates to what is known as a Christmas tree garden, and consists of an inclosure for the tree formed of side walls, and means for supporting the same in upright position.

It consists also in adapting the inclosure to simulate a stable, and a representation of the Christ child, and Mary, his mother therein, according to the Biblical history of the birth of the Saviour at Bethlehem.

It consists also of other side members simulating a fence as a member of the inclosure.

It consists also of novel means for supporting the various wall members in upright position, either on a table, stand, etc., or on the floor of the apartment in which the tree is displayed.

The invention is satisfactorily illustrated in the accompanying drawing, but the important instrumentalities thereof may be varied, and so it is to be understood that the invention is not limited to the specific details shown and described.

Figure 1 represents a perspective view of a Christmas tree garden embodying my invention. Fig. 2 represents a top or plan view of the side members of the device in opened-out condition. Fig. 3 represents a top or plan view of a base that may be employed to support the side members of the device in upright position. Fig. 4 represents a section of a portion on line $x$—$x$ Fig. 3. Fig. 5 represents a top or plan view of the side members of the device in folded condition. Fig. 6 represents a top or plan view of the base shown in Fig. 3 in folded condition. Fig. 7 is a top plan showing a grooved foot in lieu of the blocks, forming the base. Fig. 8 represents a side elevation thereof. Fig. 9 represents a plan view of a portion of another embodiment of the invention.

Similar numerals of reference indicate corresponding parts in the figures.

Referring to the drawings:—

1 designates what I denominate as a Christmas tree garden which is an inclosure for such tree which is dressed and set up for the observance of the Christmas festival as well known, said inclosure being formed of the walls 2, 3, and 4, which stand upright when in normal position.

The wall 2 which in the present case comprises what may be termed the back ground of the garden is scenic, simulating the stable at Bethlehem, in which, according to the Biblical account the Christ child was born, and the inn in which "there was no room for Mary," the expected mother, on her arrival there.

The walls 3 and 4 simulate a fence as the sides and front of the garden. The several walls as disposed may be placed on a table, or stand, on a floor around the holder of a Christmas tree and form a suggestive association of the event at Bethlehem with the celebration of Christmas in which a tree at the present day forms such an important part.

As the walls should be connected in order that they will stand upright, I may apply to the opposite ends of the same respectively, the flexible hinges 5 which allow said walls to be manipulated to assume the form of the walls in operative position, and also admits of folding of said walls on or against each other, as shown in Fig. 5. When the walls are made of comparatively light material, which may be card-board, paste-board, or the like, they may be sustained in upright position and location by placing their lower ends in a base which in Figs. 3, 4, and 6, is composed of a number of blocks 6 arranged in the form of the inclosure and having vertically-extending grooves 7 in the upper faces thereof, the same being adapted to have the lower ends of the walls fitted therein, and so hold the walls in upright position, it being evident that as the walls are connected with each other, when they occupy the grooves 7, they break joints at the adjacent ends of the blocks, and so prevent the blocks and consequently the walls from spreading or comparative disintegration of the inclosure.

Should it be desired to fill the space within the blocks I may employ a board such as 8, and connect the blocks with the sides thereof by dowels 9, shown in dotted lines or other means, but in this case, as is evident, the grooves 7 can be formed directly in the side portions of the upper face of said board, as shown in Fig. 9, this, however, it is believed is not desirable as it adds to the weight and expense of the device. The blocks may, however, be substituted by the grooved feet 10 which reduce the length and weight of the blocks and in a measure form sufficient supports for the latter in their upright operative position.

It is evident that the walls may be lifted from the blocks and folded, as in Fig. 5, and the blocks also placed one on the other, as in Fig. 6, so as to form a compact bundle or bundles for storing, packing, and transportation.

It is evident also that the device forms an amusement as well as instruction concerning the birth of Christ.

Having thus described my invention what I claim as new and desire to secure by Letters Patent, is:—

1. A Christmas tree garden composed of a scenic-wall simulating a stable and the event of the birth of the Christ-child therein, other walls flexibly connected to each other and with said scenic-wall simulating a fence forming with said wall an inclosure for a Christmas tree, and a base of separable sections adapted to support said walls in upright position with said sections in connected condition.

2. In a Christmas tree garden, an inclosure formed of side walls hingedly united to be folded on each other, and means for supporting said walls in upright position, said means being formed of members that may be folded on each other.

3. In a Christmas tree garden, an inclosure formed of side-walls flexibly connected at their meeting ends, and base blocks having grooves in their upper faces for the reception of the lower edges of said side-walls and having the terminals of said grooves at the contiguous ends of said blocks registering.

4. In a Christmas tree garden, an inclosure formed of a side-wall representing a building structure and other walls extending from the ends of such structure, said walls being flexibly connected at their meeting ends, and base-blocks formed with grooves in their upper faces into which the lower edges of said side-walls fit and having the terminals of said grooves at the contiguous ends of said blocks registering and communicating.

5. In a Christmas tree garden, a base-structure of separate blocks formed in its upper face with grooves circumscribing the outline of an inclosure, and side walls of flexibly connected sections forming such inclosure and having their lower edges inserted into said grooves and having their outlines shaped to represent a building structure and side walls extending from such structure.

6. A Christmas tree garden, an inclosure composed of a scenic wall simulating a stable and the event of the birth of the Christ child therein and other walls simulating a fence connected flexibly with each other and with said scenic wall, and a device adapted to support said walls in upright position, said device being formed of separate members adapted to be folded together.

7. A Christmas tree garden embodying an inclosure composed of walls forming the sides thereof, a supporting base composed of separate blocks having therein grooves continuous about the corners of said base to receive said walls and sustain them upright, and means for connecting said walls together whereby they hold said blocks in operative position, said walls being adapted to break joints at the contiguous ends of the blocks to prevent separation of the latter.

JOHN A. WIEDERSHEIM.

Witnesses:
 WM. CANER WIEDERSEIM,
 N. BUSSINGER.

Copies of this patent may be obtained for five cents each, by addressing the "Commissioner of Patents, Washington, D. C."